INVENTOR
ARTHUR W. HOLT
BY Howard L. Rose
AGENT

INVENTOR
ARTHUR W. HOLT
BY Howard L. Rose
AGENT

June 24, 1958 A. W. HOLT 2,840,799

VERY RAPID ACCESS MEMORY FOR ELECTRONIC COMPUTERS

Filed Aug. 8, 1952 6 Sheets-Sheet 3

INVENTOR

ARTHUR W. HOLT

BY Howard L. Rose

AGENT

VERY RAPID ACCESS MEMORY FOR ELECTRONIC COMPUTERS

Filed Aug. 8, 1952 6 Sheets-Sheet 4

INVENTOR
ARTHUR W. HOLT

BY Howard L. Rose
AGENT

INVENTOR
ARTHUR W. HOLT
BY Howard L. Rose
AGENT

June 24, 1958 A. W. HOLT 2,840,799

VERY RAPID ACCESS MEMORY FOR ELECTRONIC COMPUTERS

Filed Aug. 8, 1952 6 Sheets-Sheet 6

INVENTOR

ARTHUR W. HOLT

BY Howard L. Rose

AGENT

United States Patent Office 2,840,799

Patented June 24, 1958

2,840,799

VERY RAPID ACCESS MEMORY FOR ELECTRONIC COMPUTERS

Arthur W. Holt, Silver Spring, Md., assignor to the United States of America as represented by the Secretary of Commerce Application August 8, 1952, Serial No. 303,452

17 Claims. (Cl. 340—174)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, as amended (45 stat. 467; 35 U. S. C. 45).

This invention relates to the art of memory systems for high-speed electronic computers, and in particular relates to the development of a regenerative memory system employing capacitors and diodes. One of the most pressing needs in the development of high-speed digital computers is for a new type of memory system which will have rapid parallel access to any random word and which will at the same time be as reliable as the rest of the computer circuitry. At present there are two types of high-speed memory systems in wide use in computers, both of which store information in the binary form. Each word to be stored is made up of any desired number of binary bits, a binary bit corresponding to a decimal digit. In the mercury memory the electrical impulses representing the words to be stored are fed to a crystal transducer which induces traveling waves in a column of mercury, the traveling waves being indicative of the information to be stored. In the other system, the Williams type memory, the words to be stored are represented on the face of a cathode ray tube by an electrical charge which is indicative of the information which is to be remembered.

The mercury type memory is very reliable, but on the other hand it is comparatively slow. For instance, if 512 words are to be remembered and 64 memory tanks are used, each tank must hold 4 words. These words are fed into the tank serially and are read out serially. Therefore if it is desired to have access to the last word in the tank, the machine must wait until the other three words have passed and then read out the fourth word. Also it will be noted that each bit of the word is also read out serially, and therefore, if the information is to be used in a parallel machine, some system of conversion must be used. As a result the system is comparatively slow and greatly reduces the speed at which the computer can operate.

The Williams type memory is a rapid access system which reads out the information in parallel; however, on the other hand, the values of the voltages and circuit components must be hald to very close tolerances and therefore the system often gives trouble. As a result this system does not meet the requirement of reliability which is essential in computer work. In the Williams type system, for instance, 45 cathode-ray tubes may be used with 512 bits of information stored on the face of each tube. In this system when it is desired to select a particular word the electron beams of all 45 tubes are deflected to the proper position and then all 45 bits for each word are read out simultaneously. In this system, however, the selection operation is very critical in that the positioning of the electron beam must be extremely accurate. Also the speed at which this system can operate is limited by the beam current, since it takes a certain value of beam current operating over a period of time to write or read the information from a cathode-ray tube. If the beam current is made large so as to cut down the reading or writing time, a splash will occur on the face of the tube which will destroy the information written in the areas around the particular spot being investigated. When the beam current is reduced to a point where it will not cause serious splash, the writing time must be increased. Although the Williams memory is comparatively fast, it is so uncertain in operation that most machines using the Williams memory are not in operation even fifty percent of the time. It is therefore apparent that it is necessary to develop a new type of memory system for computers which will be both rapid and reliable.

It is therefore the primary object of this invention to provide a memory system which is very rapid and also highly reliable.

It is another object of the invention to use capacitors in which to store the information which is to be remembered.

Another object of this invention is to provide a memory system in which the length of time it takes to write the information to be stored may be varied according to the speed at which the computer operates.

Another object of this invention is to provide a memory system for electronic computers which is easily maintained and in which troubles may be readily spotted.

Another object of the invention is to provide a memory system in which it is possible with a remarkable degree of accuracy to devise a system on paper and be assured that it will operate.

Another object of the invention is to provide a memory system in which the equipment will be rugged enough to withstand serious vibrations.

Another object of the invention is to provide a memory system for electronic computers which will have rapid access to random addresses.

In accordance with the preferred form of the invention a first end of a capacitor is connected to the cathode of a first diode and to the plate of a second diode. The plate of the first diode is connected to a negative source of voltage and can be pulsed to approximately ground potential. The cathode of the second diode is connected to a positive source of voltage and may also be pulsed to ground potential. The second end of the capacitor is grounded through a resistor and in the absence of any pulses in the circuit will be maintained at ground potential. When it is desired to write information in the capacitor, the plate of the first diode and the cathode of the second diode are pulsed simultaneously so that the first end of the capacitor is held at ground potential. The second end of the capacitor is either raised to a positive level with respect to ground or lowered to a negative level with respect to ground according to the desired information which is to be written. These pulses will remain on only as long as is necessary to charge the capacitor, which may be less than 0.5 microsecond. When the initiating pulses are removed from the capacitor, the second end of the capacitor will again assume ground potential and the first end of the capacitor will be either positive or negative with respect to ground according to the information pulse which was applied to the second end of the capacitor. If the information pulse was positive, then, when the pulses are removed, the first end will be negative with respect to ground. Similarly if the information pulse was negative, the first end of the capacitor will become positive with respect to ground when the pulses are removed. Means are provided for writing, reading, and regenerating the charges stored on the capacitors. In this system 1024 words, having 50 bits of information per word, are made into a complete memory system. Of course, any number of words, having any number of bits per word, can be made into a complete system. The selection of the word to be read at any particular time is made through a selection matrix of 32 horizontal and 32 vertical buses. A transformer and-gate is connected at each cross-over of these buses. Each and-gate has two secondaries in the output circuit, the first of these supplying a positive pulse to the first diode of the system and the second of these supplying a negative pulse to the second diode of the system.

Other uses and advantages of the invention will become apparent upon reference to the specification and drawings.

Figure 1:
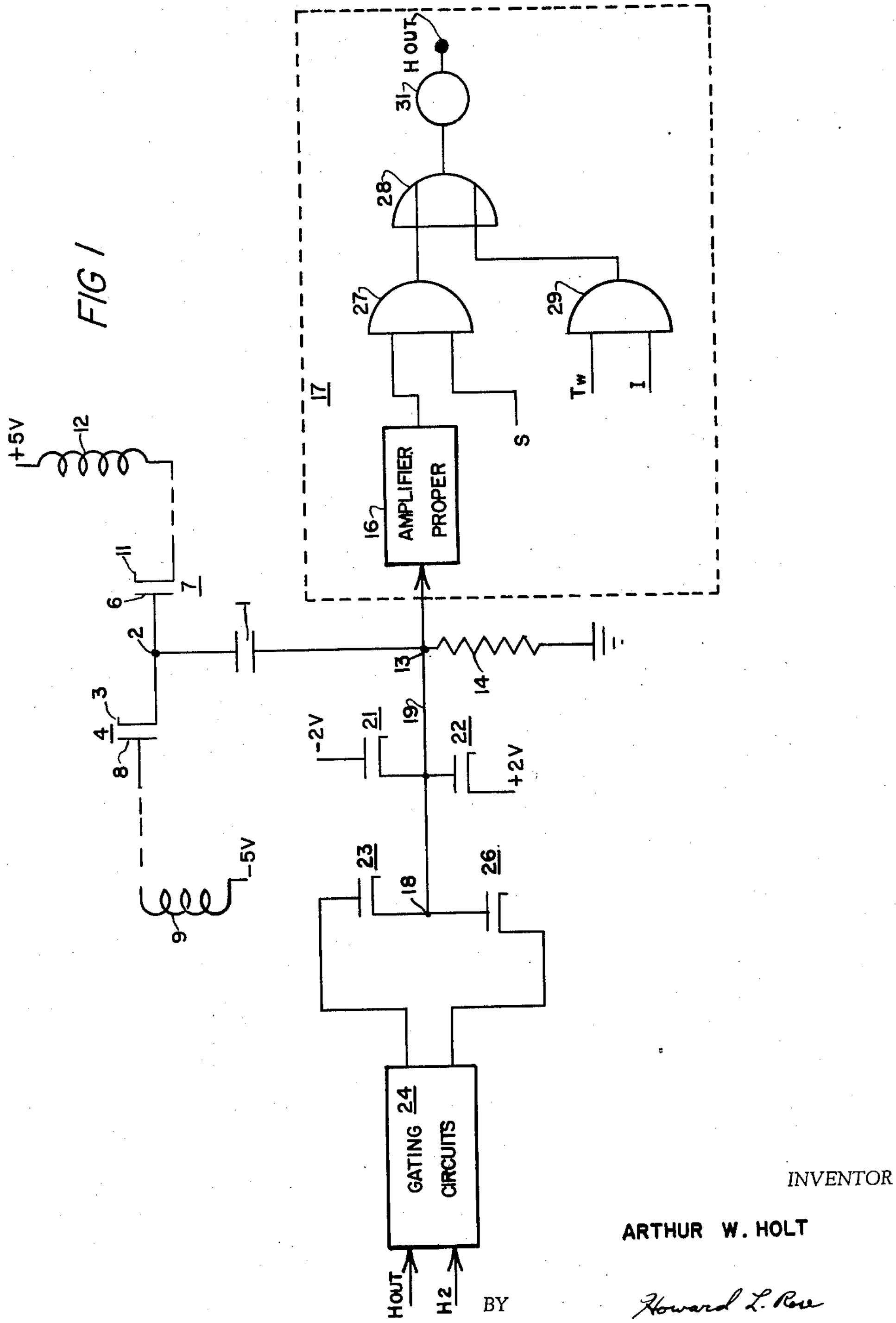
Figure 1 is a circuit diagram of the preferred form of the invention showing a system in which only a single binary bit may be stored.

Figure 1 is a circuit diagram of the present invention showing the operation of the preferred form of the invention. In this circuit, provisions are shown for storing only a single binary bit. However, reference will later be made to Figure 3 in which an overall system for storing several bits is shown.

Referring specifically to Figure 1, there is shown a capacitor 1 with its upper end connected at the junction 2 to the cathode 3 of the diode 4 and also connected to the plate 6 of the diode 7. The plate 8 of the diode 4 is connected through the transformer winding 9 to a −5 volt supply. The cathode 11 of the diode 7 is connected through the transformer winding 12 to a +5 volt supply. The specific voltages chosen are merely to indicate the operation of the system, and the invention is not limited to these specific voltages. The lower end of the capacitor 1 is connected at the junction 13 to the resistor 14, the other end of which is grounded. The junction 13 is also connected to the input of the amplifier 16 of the gating amplifier 17 and also to the junction 18 by the wire 19. Connected to the wire 19 is the cathode of the diode 21, the plate of which is returned to a −2 volt supply and to the plate of the diode 22, the cathode of which is returned to a +2 volt supply. The junction 18 is connected to the cathode of the diode 23, the plate of which is connected to the positive output of the gating circuit 24. Junction 18 is also connected to the plate of the diode 26, the cathode of which is returned to the negative output of the gating circuit 24. The output of the amplifier 16 is fed to the and-gate 27 which also receives a pulse from the stroke pulse, S, of the computer. The output of the and-gate is fed to the or-gate 28, which also has an input from the and-gate 29. The output of the or-gate is fed to the tube 31 and the output of tube 31, designated $H_{out}$, is sent to the computer and back to the gating circuit 24. The inputs to the and-gate 29 are the timing pulse, $T_w$, and the pulse, I, from the shift register of the computer. An $H_2$ pulse is also fed to the gating circuit 24.

The meanings of the terms and-gate and or-gate are well known in the computer art, but for the sake of clarity they will be defined here. An and-gate is an electronic circuit with at least two inputs which will pass a signal only when a signal appears on all of the inputs simultaneously. An or-gate is a circuit with at least one input which will pass a signal that appears on any of the input leads regardless of the signal condition of the other input leads, if any. A detailed explanation of these circuits may be found in application Serial No. 193,696, filed November 2, 1950.

Figure 2:
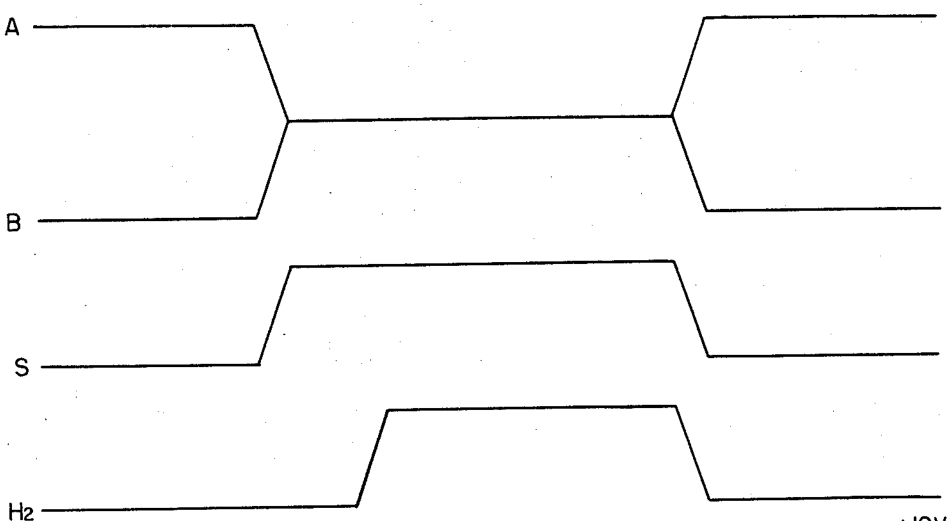
Figure 2 shows the wave forms of the different inputs to the system in Figure 1.

In any regenerative memory system for an electronic computer there are three cycles which the machine must perform. The first of these is to write the information into the memory system. The second is to read the information back out of the memory system, and the third is to regenerate the information already in the memory system. These three cycles will now be described with reference to the circuit of Figure 1. When it is desired to write information into the capacitor, assuming that there was no information there previously, a positive pulse, B, is put out by the transformer winding 9 which drives the plate of the diode 4 to zero potential. (See Figure 2.) At the same time a negative pulse, A, is put out by the transformer winding 12 which drives the cathode of the diode 7 to ground. This clamps the point 2 at the top of the capacitor 1 at ground potential. At the same time that these pulses are being applied to the diodes 4 and 7, the $T_w$ pulse is fed to the and-gate 29, and the information pulse I from the computer is also fed to this same gate. For the purpose of explanation it is assumed that a "1" is to be stored in the capacitor and that the binary "1" in this particular machine is represented by a positive pulse. The two positive pulses appearing at the input to the and-gate 29 actuate the gate and send a pulse to the or-gate 28. This pulse appears at the input to the tube 31 which amplifies the signal and then sends the pulse out as the $H_{out}$ signal. This pulse appears at the $H_{out}$ lead to the gating circuit 24. At the same time that this signal appears at the $H_{out}$ lead an $H_2$ signal is supplied from the computer proper. The $H_2$ signal is supplied to the circuit 24 input a short time after the application of the A, B, and S pulses. This is done in order to allow for delay in the operation of the gates 27, 28, et cetera. With the concurrence of the $H_{out}$ and $H_2$ signals the gating circuit 24 puts out a positive pulse on the positive pulse output which is fed through the isolation diode 23 to the junction 13. The diode 22 which is returned to +2 volts will clamp the signal at +2, preventing it from rising any higher. Since the top of the capacitor 1 is being held at ground potential and the junction 13 or lower end of the capacitor 1 has been raised to +2 volts, a charge will be stored in the capacitor. When the pulses to the diodes 4 and 7 and the inputs to the gating circuit 24 are removed, the junction 13 returns to ground potential. At this time, since there is a charge on the capacitor, junction 2 returns to −2 volts. It will be seen that when the wave forms were on the capacitor the junction 2 was 2 volts minus with respect to junction 13. Therefore when the junction 13 is returned to ground the junction 2 will become −2 volts. This −2 volts at the point 2 represents a binary "1" in the present system.

When it is desired to write a zero condition into the capacitor 1 the same procedure is followed as in writing a "1" except that there is no input on the information line to the gate 29. Therefore no pulse appears at the $H_{out}$ lead to the gating circuit 24. The $H_2$ pulse does appear, and when the $H_2$ pulse appears and the $H_{out}$ pulse does not appear, a negative output appears on the negative output line from the gating circuit 24. This negative pulse is fed to the isolation diode 26 and drives the point 13 minus with respect to ground by 2 volts. This is held at a maximum of −2 volts by the clamping diode 21. Since the junction 2 has again been held at ground potential the lower plate of the capacitor becomes minus with respect to the upper plate. Therefore when the signals are removed from the capacitor, and the junction 13 returns to ground potential, the point 2 or upper terminal of the capacitor 1 becomes +2 volts with respect to ground. This then is the storage signal for a binary zero in the present system. Initially, it was assumed that there was no charge in the capacitor 1. However if there had been a charge on the capacitor it might destroy the present input signal, if it were to come through the and-gate 27, and eventually reach the $H_{out}$ line. It becomes apparent that some method must be used for preventing the output of the amplifier proper 16 from reaching the $H_{out}$ line during the writing cycle. This is accomplished by the strobe pulse input to the and-gate 27. At any period when the machine is writing into the storage system a strobe pulse does not appear on the input to the and-gate 27 and therefore the gate will not pass any signal appearing on the output of the amplifier proper 16. During the reading and regeneration cycles a strobe pulse will appear on the input to the end-gate 27 at the same time that pulses appear at the diodes 4 and 7 and when the $H_2$ pulse appears at the input to the gating circuit 24.

The next cycle to be considered is the reading cycle. It is assumed that information has been stored in the capacitor, and it is now desired to take this information out to the machine and at the same time to maintain the signal that was in the capacitor, because the machine may wish to use that information again later. The reading cycle is very much like the writing cycle as far as the capacitor is concerned. Voltage pulses are generated in the transformer windings 9 and 12 which clamp the junction 2 and the upper plate of the capacitor 1 at ground potential. Assuming that a binary "1" had been written into the capacitor previously and therefore the upper plate of the capacitor at junction 2 had been negative with respect to ground, then when the transformer secondaries 9 and 12 feed pulses to the diodes 4 and 7 and clamp the point 2 at ground potential, the point 13 will be driven to a +2 volt condition with respect to ground. The input to the amplifier 16 is amplified and when the strobe pulse appears on the input to the an-gate 27 the amplifier output will be fed through the or-gate 28, amplifier 31 to the $H_{out}$ line and subsequently fed back into the input of the gating circuit 24. When $H_2$ and $H_{out}$ appear at the input to the gating circuit 24 the same operation takes place as in the initial writing cycle and the terminal 13 will be driven back to +2 volts with respect to ground and the condition that was initially in the condenser will be maintained. The $H_{out}$ line, although this is not shown, also feeds back to the computer and carries the information that was stored in the capacitor 1 into the computer circuitry. When a binary zero had been previously stored in the capacitor, and it is desired to read this information out into the machine again, pulses from the transformer windings 9 and 12 are fed to the diodes 4 and 7, and the point 2 which had previously been at +2 volts with respect to ground will be driven to ground potential. When the junction 2 is driven to ground potential, the lower end of the capacitor 1 or junction 13 is driven to −2 volts with respect to ground. The amplifier 16 is so biased that it is cut off at ground potential and therefore when the junction 13 or the input to the amplifier is driven to −2 volts it will have no effect on the amplifier and no output will be sent to the gate 27. Therefore no output will appear on the $H_{out}$ line which will represent a binary zero to the machine, and no input will appear on the $H_{out}$ line to the gating circuit 24. When the $H_2$ pulse is applied to the gating circuits the negative output line will be pulsed with a negative output maintaining the junction 13 at −2 volts. This then will cause the zero binary condition to be rewritten into the capacitor 1.

The regeneration cycle is exactly like the reading cycle except that the information is not gated into the machine. The circuitry for preventing this information from appearing in the machine is not shown, since it is standard with most memory systems. The regeneration cycle is necessary in computors of this type, since the computor may store information in a particular binary cell and not have need for it for some time. Because diodes 4 and 7 do not have infinite back resistances, there will be some leakage through these diodes from the capacitor 1 which would ultimately destroy the charge which was stored on the capacitor. Therefore periodically when the machine is not calling for information from the memory system a counter circuit, which is not shown and not necessary to an understanding of the present system, will cause the inputs to the memory circuit to be pulsed sequentially and thereby initiate a reading cycle which will automatically, through the operation of gating circuit 24 restore the desired charge on the capacitor 1.

Figure 1 merely shows a single cell for storing a single binary bit, and from this figure it would seem that if one were desirous of storing, say, two words of two binary bits apiece, the system would require four gating amplifiers with the associated gating circuitry. However, this is not true, as is shown by reference to Figure 3. It will become apparent after an explanation of this figure that there need be only one amplifier for each bit for all of the words stored in the memory system. That is, if there are 1024 words with 50 bits apiece, one amplifier will take care of, say, the first bit for all 1024 words. Therefore for the storage of 1024 words of 50 bits apiece there need be only 50 amplifiers with the associated gating circuits. This can readily be demonstrated by referring to Figure 3.

Figure 3:
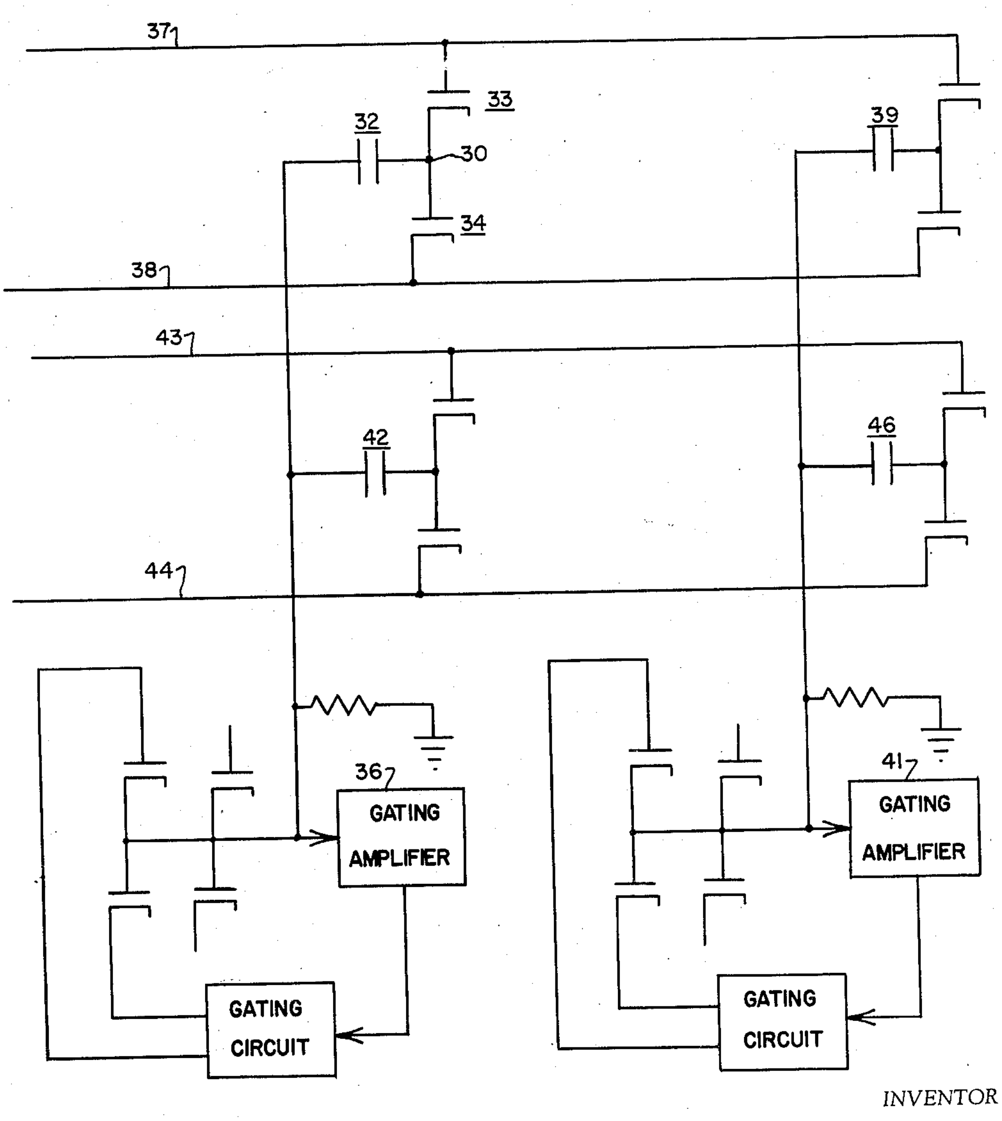
Figure 3 shows the system according to Figure 1 incorporated in a system for recording two words having two binary bits apiece.

In Figure 3, one terminal of the capacitor 32 is connected to the junction 30 of the cathode of diode 33 and the plate of the diode 34. The other end of the capacitor is connected to the input of the amplifier 36. The plate of the diode 33 is connected to the input line 37 and the cathode of the diode 34 is connected to the input line 38. The capacitor 39, which contains the second bit of the first word is similarly connected to the input lines 37 and 38, but the other terminal of the capacitor is connected to the input of the amplifier 41. The capacitor 42, which contains the first bit of the second word is connected to receive pulses from the input lines 43 and 44 in the same manner that the capacitors 32 and 39 are connected to receive pulses from the input lines 37 and 38. The other terminal of the capacitor 42 is connected to the input of the amplifier 36, the same amplifier that the capacitor 32 is connected with. The capacitor 46 is connected to the input lines 43 and 44 in the same manner as the capacitor 42 is connected to these lines. However, the other terminal of the capacitor 46 is connected to the input of the amplifier 41, the same amplifier as the capacitor 39 is connected to. For the purposes of explanation, assume that the capacitor 32 is storing a binary zero; that is, the right plate of the capacitor is positive with respect to the left terminal, and that the capacitor 39 is storing a binary "1" and therefore the right plate of the capacitor is negative with respect to the left plate. Also in word 2 capacitor 42 is storing a binary "1" and the capacitor 46 is storing a binary zero. When the input lines 37 and 38 are pulsed, as discussed with reference to Figure 1, the first bit, or capacitor 32, will produce no input to the amplifier 36, since the left plate of the capacitor will be driven minus with respect to ground. Therefore a negative pulse will appear at the left side of both capacitors 32 and 42. Since the right end of capacitor 32 has been held at ground potential, the initial condition will be rewritten. With regard to capacitor 42, the left terminal of the capacitor had previously been positive with respect to ground. However, the pulse at the lower end will have no effect upon the charge upon the capacitor, since the right end is not clamped at ground potential and can rise, or in other words float with respect to the left plate. Therefore the condition of the capacitor 42 is not disturbed by the fact that a pulse has appeared on the left plate of the capacitor. Similarly with regard to capacitors 39 and 46, when the input lines 37 and 38 are pulsed, a positive pulse appears at the input to the amplifier 41, due to the action of capacitor 39, which is fed back again to the left plates of the capacitors 39 and 46. This will merely rewrite in capacitor 39 the condition that was already there. However, with regard to capacitor 46, since the right plate of the capacitor is free to float between certain limits, the pulse at the left plate will not affect the charge which is stored on the capacitor and the binary zero which had been stored there previously will not be disturbed. In this arrangement and the others that follow, the unpulsed diodes isolate their associated capacitors from the system while the pulsed diodes connect their associated capacitors into the system. Also it can be seen from the above explanation that a single amplifier can be used for reading, writing, and regenerating all of the corresponding bits in each word. Therefore in a system in which there are 1024 words containing 50 bits apiece, one amplifier will serve the first bit in each 1024 words, another amplifier will serve the second bit in each 1024 words, et cetera, and therefore only 50 amplifiers are needed for the 1024 50-bit words.

Thus far the discussion has been concerned with the circuitry that is to be employed for memorizing a few bits of information and no thought has been given to the development of a practical system that might be used in conjunction with a computer. As previously stated, it is desired to develop a memory system which will remember 1024 words, each word being made up of 50 binary bits. In order to build an operative memory having storage facilities for so many words a practical means for selecting one out of 1024 words, or any other given number of words, at any given time must be developed. Such a system to be practical must permit the selection of a single word out of the entire system without affecting any of the other 1023 words and must also permit selection of the proper word at very high rates of speed. In order to build a practical 1024-word selection matrix, it is imperative that the pulse power needed on any one line be kept lower than about 10 watts, since it is very difficult and expensive to build hard tube circuits which are capable of driving more than this amount of power at high speeds. In order to solve this problem a transformer and-gate was invented which draws current only when the gate is selected by the matrix. This invention forms the subject of my copending application Serial No. 303,451, filed August 8, 1952. A description of a selection matrix system incorporating the transformer and-gate will be given in the discussion of Figure 4.

Figure 4:
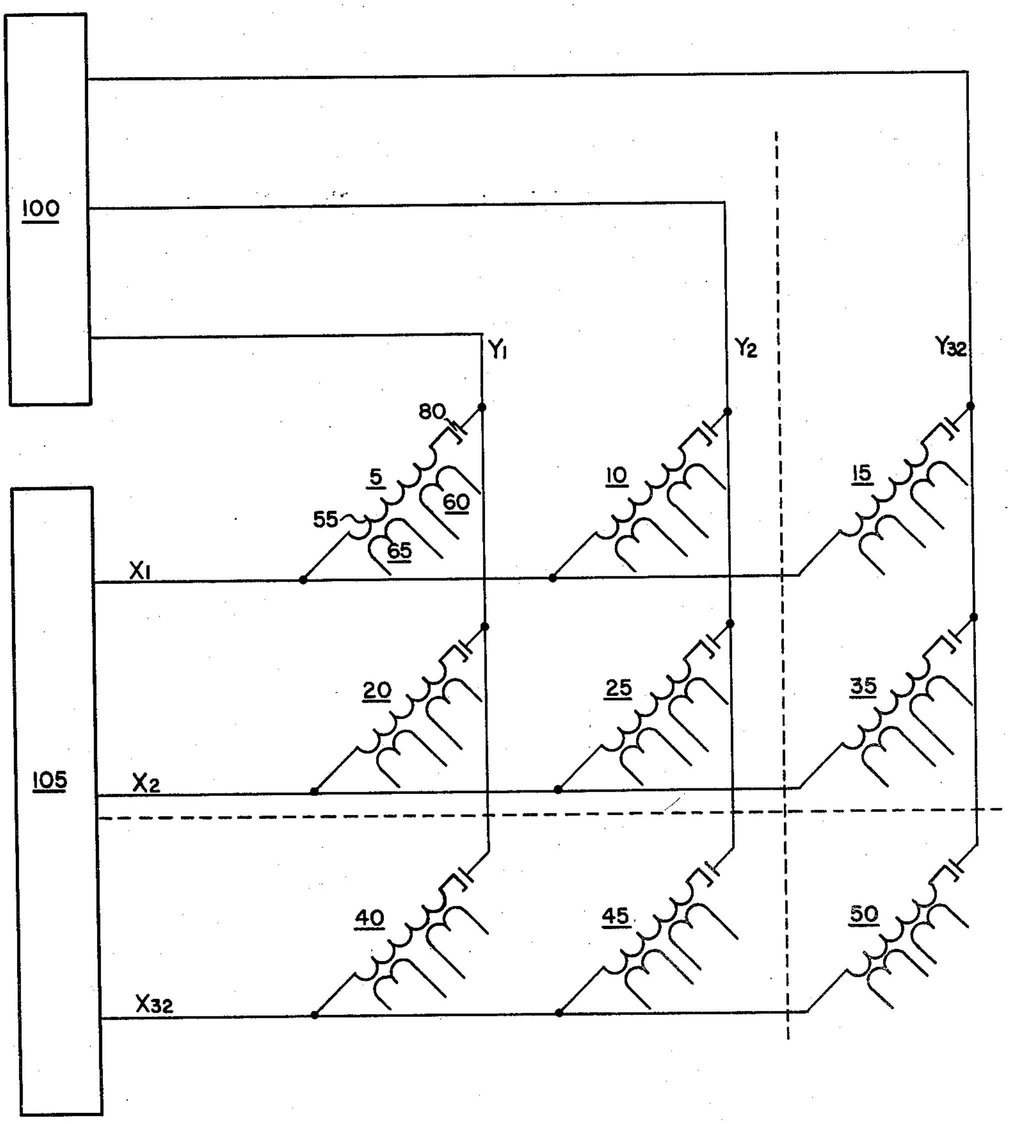
Figure 4 is a circuit diagram of a selection matrix system which may be used with the present invention.

In Figure 4, there are 32 vertical or "Y" buses of which $Y_1$, $Y_2$, and $Y_{32}$ are shown. There are also 32 horizontal or "X" buses of which $X_1$, $X_2$, $X_{32}$ are shown. Each Y bus is connected to a separate output of a selector circuit 100 and each X bus is connected to a separate output of a selector circuit 105. The Y buses are normally biased to −5 volts and are pulsed to +5 volts by the selector circuit 100, while the X buses are normally biased to +5 volts and are pulsed to −5 volts by the selector circuit 105. At each cross-over of the X and Y buses there is connected a transformer and-gate. The gate 5 is connected at the cross-over of buses $X_1Y_1$, the gate 10 at $X_1Y_2$, the gate 20 at $X_2Y_1$, et cetera. Each gate, taking gate 5 as an example, is made up of a transformer primary 55 and two secondaries 60 and 65. The bottom end of secondary 60 may be connected to a −5 volt supply and the upper end of secondary 65 may be connected to a +5 volt supply. The lower end of the primary 55 is connected to the $X_1$ bus and the upper end is connected to the cathode of the diode 80. The plate of the diode 80 is connected to the bus $Y_1$.

With the bias voltages on the buses as indicated, no current can flow through the transformer primaries, since the cathodes of the diodes are positive 10 volts with respect to the plates of the diodes. If one of the Y buses is pulsed by the selection circuit 100 so that it rises to +5 volts, still no current can flow through the gate, since in this condition the cathode and plate of the diodes will be at the same potential and will remain in the nonconducting state. The same is true if only an X bus is pulsed. However, when an X and a Y bus are pulsed, one of the and-gates will be energized. For example, say that the $X_1$ and $Y_1$ buses are pulsed. Then the cathode of the diode 80 in and-gate 10 will become negative with respect to the plate of the diode of the gate and current will flow through the transformer primary 55. This will cause a positive pulse to appear on the output of secondary 60 and a negative pulse to appear on the output of secondary 65. These pulses will be fed to the input lines of each word and will therefore cause the memory to read out the 50 bits in the selected word. The secondaries 60 and 65 correspond to the windings 9 and 12 of Figure 3 and therefore the secondary 60 would pulse line 37 and secondary 65 would pulse line 38. It will be noted that none of the other gates will be energized, since the diodes of the gates associated with bus $Y_1$ will have only their plates pulsed, and the diodes of the gates associated with bus $X_1$ will have only their cathodes pulsed. As a result the only current that need be supplied, disregarding the negligible current drain due to leakage capacitance, is the current to a single gate, which is in the order of milliamperes. Therefore the design of a high-speed pulse driver becomes relatively simple.

The use of the above-described system has greatly reduced the selection problem from one of choosing one out of 1024 possible positions to a problem of selecting one out of 32 buses in two planes. The means for making these selections are shown as the blocks 100 and 105 in the figure. No specific circuitry is shown, since there are many ways known in the prior art for accomplishing this result. A typical example of such a circuit may be found in the publication, "A Functional Description of the EDVAC," volume 2, Moore School of Electrical Engineering of the University of Pennsylvania, drawing 104–1LC–2.

Figure 5:
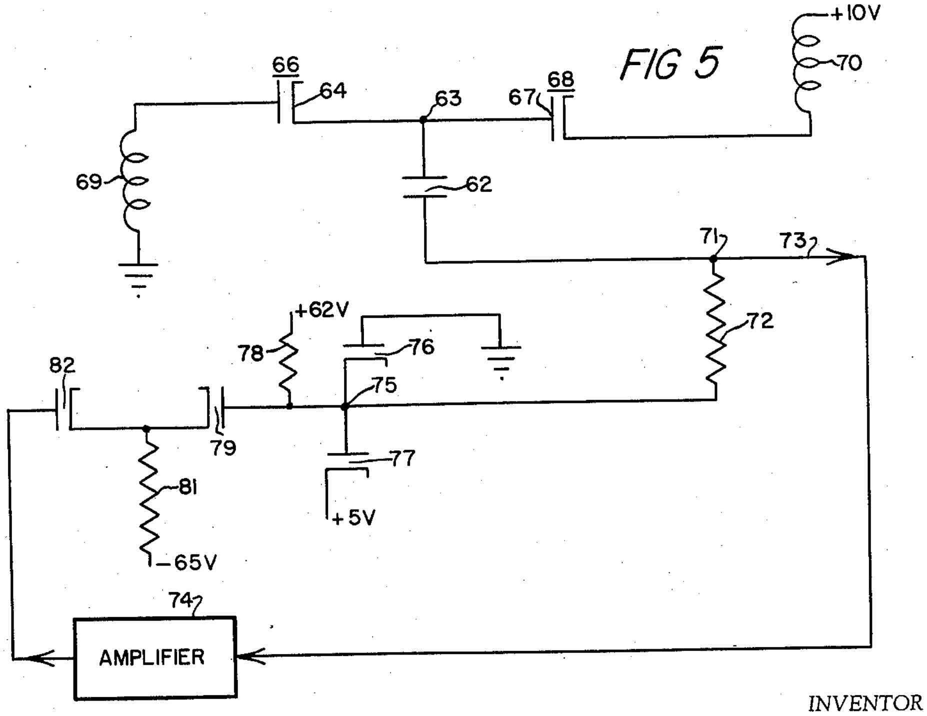
Figure 5 shows another embodiment of the invention in which a single binary bit may be stored.

Figure 5 shows another embodiment of the invention which is very similar to the device shown in Figure 1. However, in this particular system the pulses A and B to the diodes which are connected to the capacitor are not fed to the system simultaneously but occur one after the other. In this figure the capacitor 62 has its upper plate connected to the junction 63 which is joined with the cathode 64 of the diode 66 and the plate 67 of the diode 68. The plate of the diode 66 is connected through the transformer winding 69 to ground, and the cathode of the diode 68 is connected through the transformer winding 70 to a positive potential of 10 volts. The lower end of the capacitor 62 is connected at the junction 71 to the resistor 72 and the input 73 to the amplifier 74. The other end of the resistor 72 is connected to the junction 75 which is connected to the cathode of diode 76, the plate of which is grounded, and to the plate of diode 77, the cathode of which is returned to +5 volts. The junction 75 is also connected to a positive 62-volt source through the resistor 78 and to the plate of the diode 79. The cathode of the diode 79 is connected to a −65 volt source through the resistor 81 and to the cathode of the diode 82. The plate of the diode 82 is connected to receive the output from the aplifier 74. The current flow from +62 to the −65 voltage source through the resistor 78, diode 79, and resistor 81 maintains the junction point 75 at ground potential in absence of an output from the amplifier 74. The diode 76, since its plate is returned to ground potential, will prevent the junction point 75 from ever going minus with respect to ground. As before, there are three necessary cycles of writing, reading, and regeneration, of which reading and regeneration are indistinguishable so far as the memory circuits are concerned. A discussion of the writing cycle will be omitted because it should be obvious how this cycle will operate after the reading and regeneration cycles are explained. The first step in the reading cycle is the initiation of a +5 volt pulse from the transformer winding 69 to the plate of the diode 66. If the junction point 63 was initially at zero potential, indicating a binary "1," the point 63 will be raised to +5 volts and a charging current will flow through the resistors 72 and 81. A positive going signal will appear at point 71, which is connected to the amplifier input, and this signal will cause the amplifier to give a positive output pulse during the second half of the cycle. During this half of the cycle the transformer winding 70 will drive the cathode of the diode 68 down to +5 volts, thereby holding the junction point 63 at this potential. The positive signal appearing at the junction 71 will be sent to the computer as information if this is desired (that is, during a reading cycle), but its other important purpose is to restore the zero charge level. This is accomplished in the following manner: The output from the amplifier, say +5 volts, is applied to the plate of the diode 82, causing current to flow through diode 82 and resistor 81 to the −65 volt source. Since the forward resistance of the diode 82 is very small most of the voltage drop will appear across the resistor 81 and the cathodes of diodes 82 and 79 will be raised to approximately +5 volts. This causes the cathode of diode 79 to become positive with respect to its plate and biases the diode to cutoff. Current can now no longer flow from the +62 volt source to the 65-volt source and instead current flows from the +62 volt source through resistor 78 and diode 77 to the +5 volt source. Again, since the forward resistance of the diode is very small, almost all of the drop appears across the resistor 78, and the junction 75 is raised to approximately +5 volts. As a result, a +5 volt pulse appears at the junction 71, and since the junction 63 is also being held at +5 volts the charge on the capacitor is literally squeezed out, since its bottom end is held at the same potential as its top end. Therefore the charge that resulted in the capacitor from the first half of the reading cycle is effectively eliminated and the zero storage level is again restored. The reading of a positive or binary zero level presents no complications. If the top of the capacitor was at +5 volts initially, which is the charge on the capacitor indicating a binary zero, there is no charging current caused by the pulse applied by the transformer winding 69. No signal is delivered to the amplifier, and therefore the amplifier gives no output signal. Since the point 71 is maintained at ground potential, the fact that the transformer winding 70 drives the cathode of the diode 68 to +5 volts and therefore holds the point 63 at +5 volts will have no effect upon the circuit. There will still be a 5 volt differential between junctions 63 and 71. In this form of the invention the amplifier 74 will contain the same circuitry as the amplifier 17 of Figure 1. However, in the embodiment shown in this figure the gating circuits 24 of Figure 1 may be eliminated. The delay between the output pulse of winding 69 and winding 70 of the transformer and-gate can be easily obtained by inserting a delay line of suitable length in the lead from the winding 70 to the cathode of the diode 68. The system according to this figure may be used in a circuit similar to the one described in Figure 3 in which the amplifier will be connected with circuits of the type just described rather than those shown in Figure 3, which are the circuits which must be used with the system as shown in Figure 1.

Figure 6:
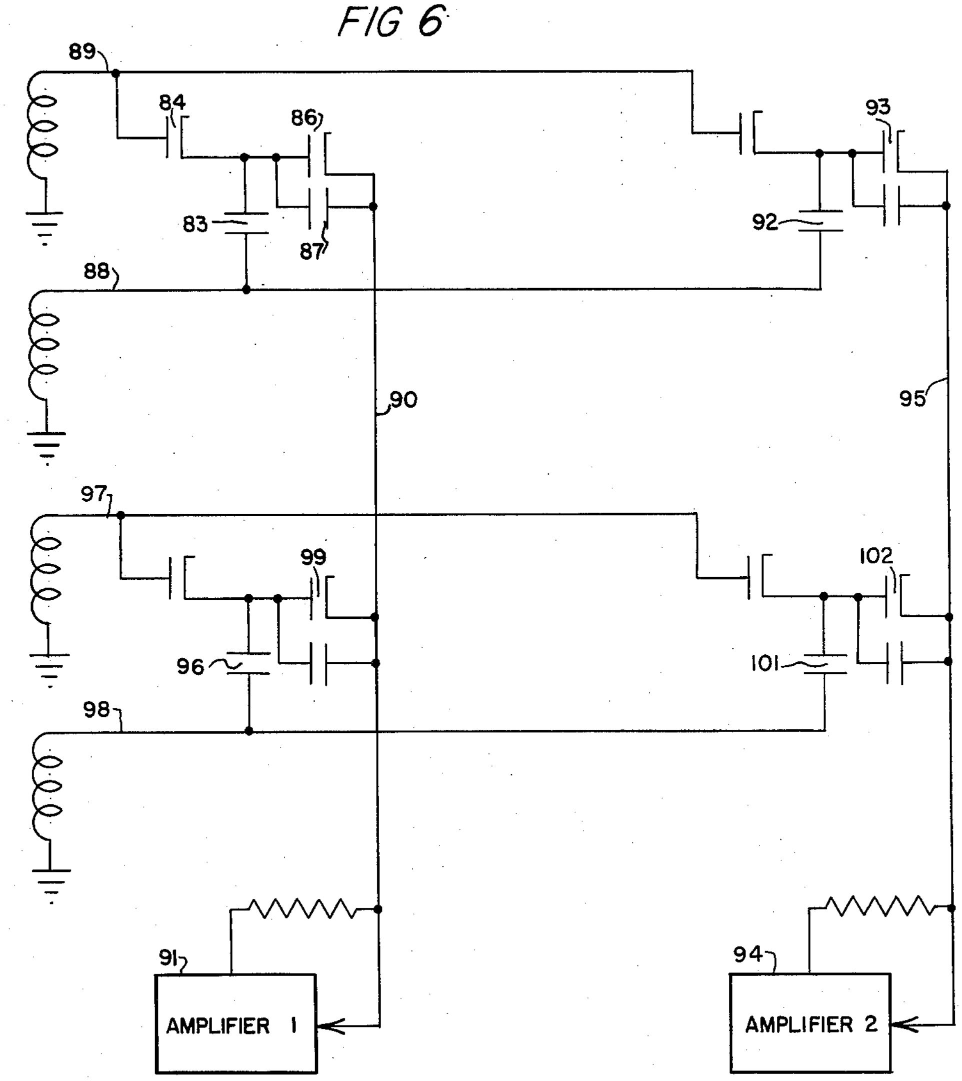
Figure 6 shows a circuit employing two words with two bits apiece in which the apparatus of Figure 5 may be employed.

Another system in which the circuit of this figure may be used is shown in Figure 6. In this system the top and bottom of the capacitor will be pulsed while the input to the amplifier will be taken across one of the diodes that is connected to the top of the capacitor. In this circuit, the capacitor 83, which represents the first bit of the first word, has its upper terminal connected to the cathode of the diode 84 and to the plate of the diode 86 and one terminal of the capacitor 87. The other end of the capacitor 83 is connected to the input line 88 and the plate of the diode 84 is connected to the other input line 89. The cathode of the diode 86 is connected to the input line 90 of the amplifier 91 and is also connected to the other plate of the capacitor 87. In a similar manner the two ends of the capacitor 92 are connected to the input lines 88 and 89, while the cathode of the diode 93 is connected to the input line 95 to the amplifier 94. The capacitor 96 which contains the first bit of the second word is connected to the input lines 97 and 98 in a manner similar to the way in which the capacitor 83 is connected to input lines 88 and 89. However, the cathode of the diode 99 is connected to the input to the amplifier 91 the same as the cathode of the diode 86. Capacitor 101 is connected to the input lines 97 and 98, but the cathode of the diode 102 is connected with the input to the amplifier 94, the same as is the cathode of diode 93 which is associated with capacitor 92. The input lines 90 and 95 are assumed to be normally biased to +10 volts. For the purposes of explanation the capacitor 83 is assumed to have no charge, i. e., storing a binary "1." Capacitor 92 is assumed to have a positive charge, i. e., storing a binary zero. Capacitor 96 is assumed to be storing a binary "1" and capacitor 101 is assumed to be storing a binary zero. The regeneration cycle will now be explained for this circuit. Input line 89 is raised from zero to +5 volts. The charging current is now supplied by line 88 instead of by the output circuitry of amplifier 91, as was the case in Figure 5. The upper terminal of capacitor 83 is raised from zero to +5 volts during this charging cycle, and this signal is transferred to the amplifier via the small shunting capacitor 87, which is in parallel with the diode 86. Upon receiving the signal the amplifier 91 drives the line 90 from +10 volts down to +5 volts and simultaneously the line 88 drives from zero to +5 volts. The capacitor 83 is again squeezed and any charge which may have accumulated is driven out and the zero charge state is returned. The reading of the capacitor 92 which was already positive does not activate the amplifier output, and although the bottom of this cell is driven up by the bus 88, the top follows right along, being clamped at +10 volts by the bus 95 to prevent overshoot, and the positive state is maintained. The capacitor 96 will not be affected by the pulsing on the bus 90, since the plate of diode 99 is at zero potential and remains at −5 volts with respect to the cathode of diode 99 which at its lowest point is driven to +5 volts. Therefore, there can be no flow from the capacitor through the diode 99. Similarly, if the cathode of diode 96 has had a positive charge, at the worst condition the cathode and plate of the diode 99 would be of the same potential and still no current would flow from the capacitor 96. The same analysis applies to the capacitor 101.

Figure 7:
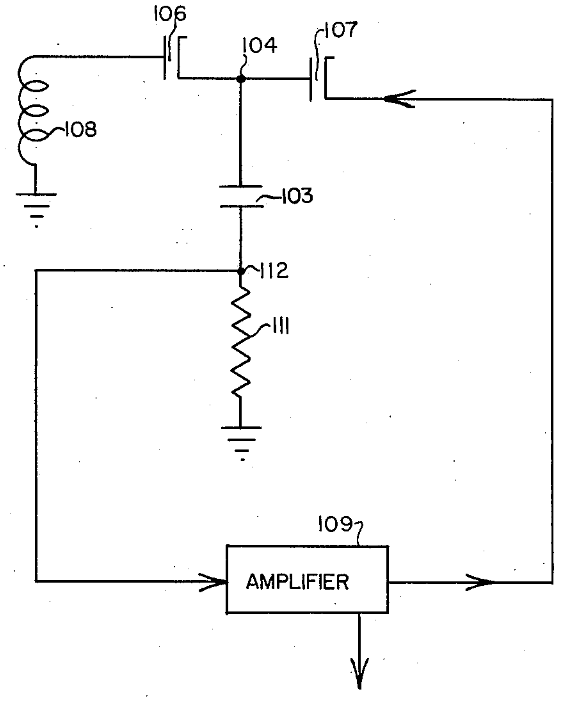
Figure 7 shows another embodiment of the invention showing provisions for storing a single binary bit.

Figure 7 shows another embodiment of the invention in which only one end of the capacitor is acted upon by the storage circuitry. It will be noted that in the embodiments of the invention shown in Figures 1, 5, and 6, the capacitor had both ends pulsed either up or down depending upon the information to be stored. In the system shown in this figure only one end of the capacitor is operated upon and the other end of the capacitor is grounded through a resistor so that control pulses can be applied only to the upper end. In this figure the capacitor 103 is connected to the junction 104 which is connected to the cathode of the diode 106 and to the plate of the diode 107. The plate of the diode 106 is connected to ground through the winding 108 of a transformer. The cathode of the diode 107 is connected to the output line 105 of amplifier 109.

The lower end of the capacitor 103 is grounded through the resistor 111, and the junction 112 of the capacitor 103 and resistor 111 is connected to the input of the amplifier 109. The output 105 of the amplifier 109 is normally biased at a potential of +5 volts. The amplifier 109 is the same as the gating amplifier 17 shown in Figure 1. It will be noted that in this modification, only one output is needed from the transformer and-gate.

In order to write the positive state in the capacitor 103 (that is, a binary zero) the transformer winding 108 applies a +5 volt pulse to the plate of the diode 106, which causes the top of the capacitor to be raised an equal amount. The initiating pulse may return to zero after the capacitor 103 has been charged sufficiently and the capacitor is left with the residual positive charge on the upper plate. As in Figure 1 no strobe pulse is applied to the amplifier 109 and therefore no signal will appear on the output to the amplifier. This process constitutes memorizing the positive state or the binary zero. In order to write the zero charge state (that is, a binary "1") the output of the amplifier 109, which is produced by the concurrence of $T_W$ and I pulses at the and-gate 29 (see Figure 1) is caused to drive from its normal potential of +5 volts down to zero voltage by reversing the phase of the output, $H_{out}$, shown in Figure 1. This will pull down the junction 104 to zero volt and after a sufficient time for discharging has elapsed, the output of the amplifier will return to its normal potential. The capacitor is now left with zero residual charge and will maintain this state indefinitely if the back resistance of the diodes is infinite. The reading cycle is very similar to the writing cycle as in the other cases. If the junction 104 is at zero potential when point A is raised from zero to 5 volts, a signal due to charging current appears at the junction 112 of capacitor 103 and resistor 111. This is amplified and sent to the arithmetic unit as a bit of information. Since it is necessary to restore the zero charge condition, this is accomplished automatically by writing the zero charge state as a sequel to reading the zero charge state; that is, the output of the amplifier drives the cathode of the diode 107 to zero volts, causing the capacitor 103 to discharge. If on the other hand the junction 104 was at +5 volts at the beginning of the read cycle the pulsing of the plate of the diode 106 to +5 volts will not draw any current through the capacitor 103 and resistor 111. The amplifier sends no signal to the arithmetic unit, thus denoting that the capacitor was storing a positive or binary zero state. Regeneration is again like the reading cycle except that the information is not gated into the computer from the amplifier 109.

It will be apparent that the embodiments shown are only exemplary and that various modifications can be made in construction and arrangement within the scope of my invention as defined in the appended claims.

I claim:

1. A capacitor memory system for use in electronic computers, comprising a plurality of capacitors one capacitor for storing each bit of each word to be stored in the memory for subsequent use by the arithmetic and control circuits of a computer, diode means connected to one plate of each of said capacitors and a first means including selection matrix means for applying voltage pulses to said diodes to cause selected capacitors to store desired information, said selection matrix means being operative to selectively apply voltage pulses to the diode means connected to the capacitors of the different words, and to simultaneously apply voltage pulses to the diode means connected to the capacitors which store the bits of a single word, the pulsed diode means being oriented to cause current flow through their associated capacitors and the unpulsed diode means being biased so as to prevent current flow through their associated capacitors.

2. The invention according to claim 1 in which said selection matrix means comprises two groups of buses, the number of buses in each group being equal to the square root of the number of words to be stored by the system, a number of two-input and-gates having at least one output, there being one and-gate for each of said words, each and-gate having one input connected to a separate bus in one of the groups of buses and the other input to each of the and-gates being connected to a separate bus in the other group of buses, the said output lead of each and-gate being connected to diode means connected to the capacitors of the word which each and-gate is to select.

3. The invention according to claim 2 in which the diode means comprises a first and a second diode connected to a first end of each of said capacitors, said first diode having its cathode connected to its associated capacitor and its plate connected to the said output lead of its associated and-gate, said second diode having its plate connected to its associated capacitor and its cathode connected to receive pulses from separate outputs of a part of said first means and the second ends of said capacitors being connected to separate input leads of a part of said first means.

4. The invention according to claim 3 in which said and-gates are transformer and-gates.

5. The invention according to claim 4 in which the second ends of said capacitors are also connected to receive pulses from separate outputs of a part of said first means.

6. The invention according to claim 5 in which said and-gates have two outputs, the second diodes having their cathodes connected to separate leads of the second outputs of the and-gates.

7. The invention according to claim 6 in which the said part of said first means consists of an amplifier and gates and a gating circuit connected to receive pulses from said gates, the second end of said capacitor being connected to the input of said amplifier and the output of said gating circuits.

8. The invention according to claim 4 in which said and-gates have two outputs, the second ends of said capacitors being connected to separate leads of the second outputs of said and-gates.

9. A memory system for electronic computing devices in which each word is stored in a separate group of storage cells and each bit of each word is stored in a separate one of the cells of a group, comprising a plurality of capacitors, there being one capacitor for each bit of each word, unilateral conducting means connected to at least one end of said capacitors, first means for producing voltage pulses to be stored by said system, second means, one for each capacitor, for producing control voltage pulses, third means, including said unilateral conducting devices, for applying said voltage and control voltage pulses to said capacitors to produce a state of charge in said capacitors indicative of the voltage pulses produced by said first means, selection matrix means for selectively energizing certain of said second means in accordance with instructions received from a computing device, and fourth means, including said unilateral conducting means, for isolating said capacitors from said system in the absence of control voltage pulses from said third means.

10. A memory system for electronic computing devices in which information to be stored is sent to the memory in the form of words composed of a predetermined number of discreet bits of information and in which each word is stored in a separate group of cells assigned to that word, each bit being stored in a separate one of the cells, said memory comprising a plurality of capacitors, there being one capacitor for each bit of each word; first means for producing voltage pulses indicative of the information to be stored by the memory; second means when energized for producing control voltage pulses, there being one such means for each of the groups of cells; third means for selectively applying the voltage and control voltage pulses to said capacitors to produce a state of charge in said capacitors indicative of the voltage pulses produced by said first means; selection matrix means for selectively energizing certain of said second means in accordance with instructions received from a computing device and fourth means for isolating said capacitors from the system in the absence of control voltage pulses, said last means comprising unilateral conducting means, connected to each of said capacitors, oriented to pass voltage pulses to said capacitors and to isolate said capacitors from the system in the absence of the voltage pulses.

11. A capacitor memory system for use in electronic computing devices, comprising capacitors in which information is to be stored, diode means connected to at least one terminal of each of said capacitors, first means for producing control voltage pulses when energized, second means, including said diode means, for passing the control voltage pulses to said capacitors and to isolate said capacitors from said first means in the absence of the control voltage pulses, selection matrix means for selectively energizing said first means, third means for producing voltage pulses indicative of the information to be stored and fourth means for coupling said voltage pulses to the selected capacitors to cause said capacitors to store said voltage pulses.

12. A capacitor memory comprising a capacitor in which different information bits corresponding to a binary 1 and binary 0 respectively are to be stored, unilateral conducting means connected to one terminal of said capacitor, means normally biasing said unilateral conducting means to cut-off, first means for producing control voltage pulses, second means, including said unilateral conducting means, for applying said pulses to said capacitor terminal to establish a first potential voltage level on at least one of the plates of said capacitor, means biasing the second terminal of said capaictor to said first voltage level, third means for producing voltage pulses corresponding in amplitude and polarity to the information bit to be stored in said capacitor connected to the other terminal of said capacitor, and means for applying said voltage pulses to said other capacitor terminal to cause said capacitor to store said voltage pulses.

13. A capacitor memory system for use in electronic computers comprising a plurality of capacitors, one capacitor for storing each bit of each word to be stored in the memory for subsequent use by the arithmetic and control circuits of a computer, unilateral condition means connected to one plate of each of said capacitors, a first means for applying voltage pulses to said capacitors to cause selected capacitors to store desired information, said first means comprising matrix selection means connected to said capacitors through at least one of the unilateral conducting means, connected to each of said capacitors, for selectively applying voltage pulses to the capacitors of the different words and to simultaneously apply voltage pulses to the capacitors which store the bits of a single word, and second means including said unilateral conducting means to pass the voltage pulses to said selected capacitors and for isolating the unpulsed capacitors from said selection matrix means.

14. A capacitor memory system for use in an electronic computer in which the information to be stored is presented to the computer in the form of groups of voltage pulses known as words and in which each voltage pulse is known as a bit, which system comprises a plurality of capacitors, one capacitor for storing each bit of each word to be stored in the memory system; a plurality of rectifiers; each of said capacitors having two rectifiers connected to one of the plates of said capacitors; selection matrix means connected to said rectifiers for applying first voltage pulses to each of the capacitors of a single word each time said selection matrix means in energized, and for selectively applying voltage pulses to the capacitors of the various words; first means for generating second voltage pulses indicative of the information to be stored in said capacitors and means for applying said second voltage pulses to the other plate of said capacitors to cause them to store the desired information.

15. The system according to claim 14 in which means are provided for biasing said rectifiers so as to allow the passage of the first voltage pulses to said capacitors and to cause the isolation of said capacitors from said selection matrix means in the absence of the first voltage pulses.

16. The system according to claim 15 in which said selection matrix means simultaneously applies the first voltage pulses to the capacitors of a single word.

17. A capacitor memory system for use in an electronic computer in which the information to be stored is presented to the computer in the form of groups of voltage pulses known as words and in which each voltage pulse is known as a bit, which system comprises a plurality of capacitors, one capacitor for storing each bit of each word to be stored in the memory system; a plurality of rectifiers; each of said capacitors having two rectifiers connected to one of the plates of said capacitors; selection matrix means, connected through one of each of said first rectifiers, for applying first voltage pulses to each of the capacitors of a single word each time said selection matrix means is energized and for selectively applying voltage pulses to the capacitors of the various words; first means for generating second voltage pulses indicative of the information to be stored in said capacitors and means, connected to said second rectifiers, for applying said second voltage pulses to said capacitors to cause them to store the desired information.

References Cited in the file of this patent

UNITED STATES PATENTS

| | | |
|---|---|---|
| 2,002,219 | Dimond | May 21, 1935 |
| 2,208,655 | Wright | July 23, 1940 |
| 2,470,303 | Greenough | May 17, 1949 |
| 2,480,795 | Wagner | Aug. 30, 1949 |
| 2,514,054 | Holden | July 4, 1950 |
| 2,518,405 | Van Durren | Aug. 8, 1950 |
| 2,582,480 | Dimond | Jan. 15, 1952 |
| 2,584,866 | Gray | Feb. 5, 1952 |
| 2,691,151 | Toulon | Oct. 5, 1954 |
| 2,720,642 | Blakely | Oct. 11, 1955 |

OTHER REFERENCES

"The Design of Switching Circuits" by Keister et al., published by D. Van Nostrand, Inc., 1951—page 458.

UNITED STATES PATENT OFFICE

CERTIFICATE OF CORRECTION

Patent No. 2,840,799 June 24, 1958

Arthur W. Holt

It is hereby certified that error appears in the printed specification of the above numbered patent requiring correction and that the said Letters Patent should read as corrected below.

Column 13, line 48, for "condition" read -- conduction --; column 14, line 11, for "means in" read -- means is --.

Signed and sealed this 2nd day of September 1958.

(SEAL)

Attest:

KARL H. AXLINE

Attesting Officer

ROBERT C. WATSON

Commissioner of Patents